May 18, 1971 R. J. HORST 3,579,443
FORMATION OF DENSE PRECIPITATES
Filed July 31, 1969 2 Sheets-Sheet 2
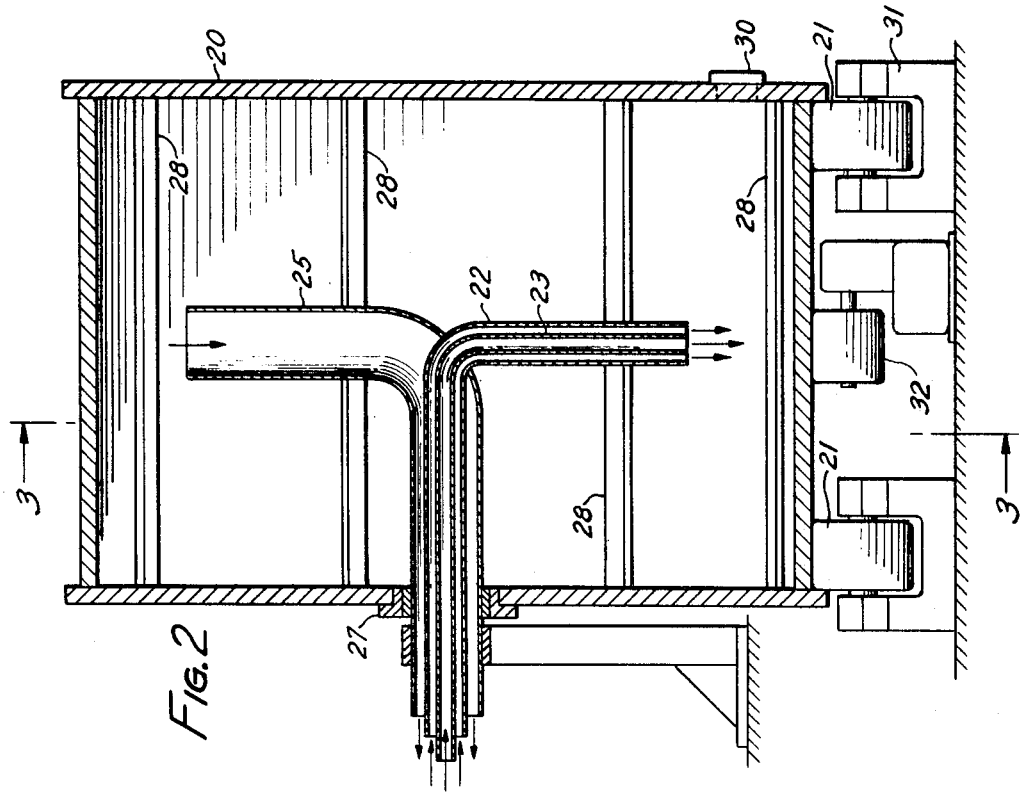
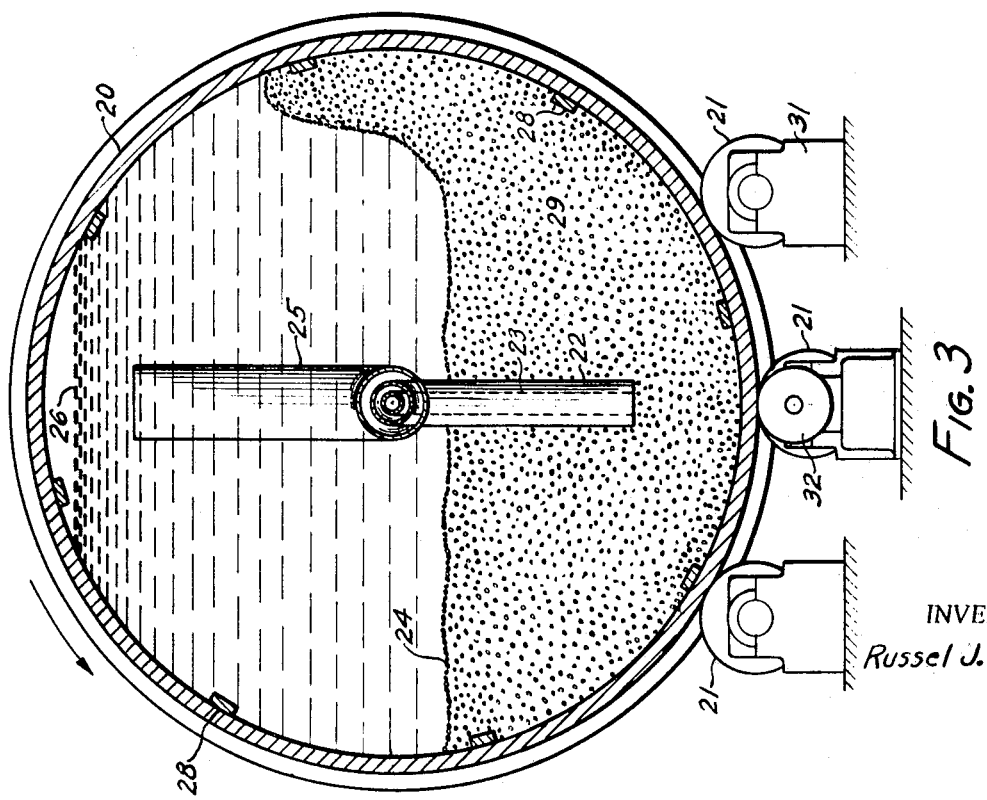
INVENTOR
Russel J. Horst

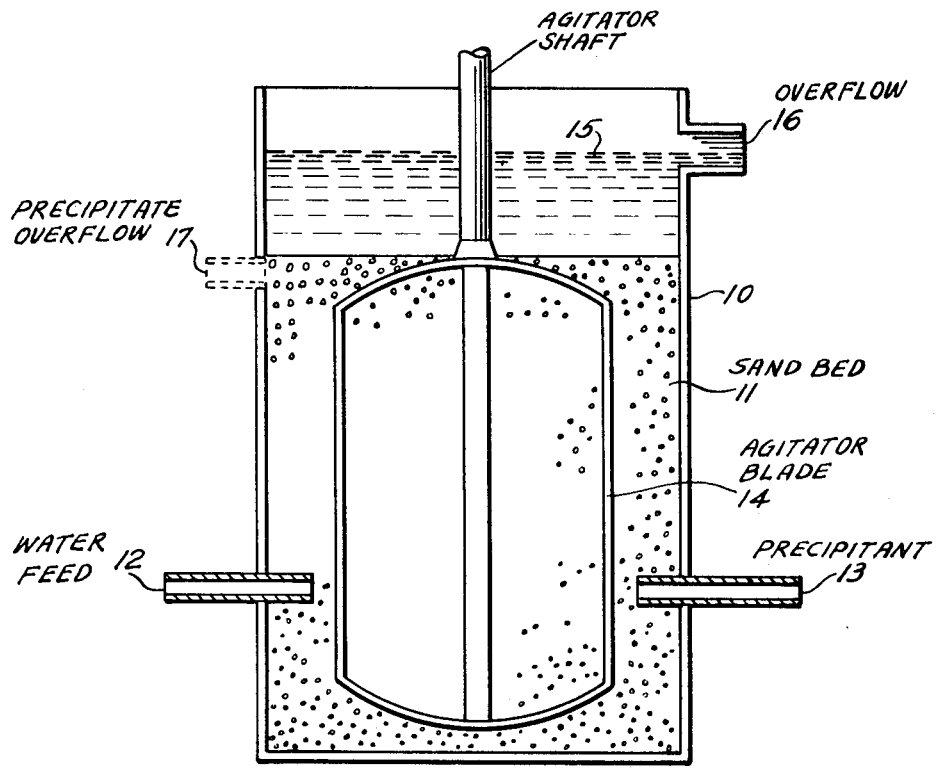

United States Patent Office 3,579,443
Patented May 18, 1971

3,579,443
FORMATION OF DENSE PRECIPITATES
Russell J. Horst, 1631 Chippendale Circle,
Bethlehem, Pa. 18017
Continuation-in-part of application Ser. No. 749,463,
Aug. 1, 1968. This application July 31, 1969, Ser.
No. 846,556
Int. Cl. B01d *21/08*
U.S. Cl. 210—49                                  24 Claims

ABSTRACT OF THE DISCLOSURE

In a process for precipitating dense precipitates from an aqueous solution of iron and mixtures of iron with other metals, the solution is introduced into a vessel containing a moving bed of a material such as sand in a water medium. Simultaneously, a solid or a liquid precipitant is introduced into the vessel, and the heavy metals, precipitating from the resultant reaction, deposit on the individual particles of the sand bed. The precipitate thus formed is dense and low in retained water. A clean water effluent, substantially free of dissolved heavy metals, is removed from the vessel.

CROSS-REFERENCES TO RELATED APPLICATION

This application is a continuation-in-part of application Ser. No. 749,463, filed Aug. 1, 1968, and now abandoned.

BACKGROUND OF THE INVENTION

This invention relates to an improvement in precipitating iron and mixtures of iron and other metals from aqueous solution, and pertains particularly to the formation of a dense precipitate of low water content.

In the precipitation of certain heavy metals from aqueous solutions, the precipitate is often of a gelatinous nature which settles quite slowly, and even when settled has the consistency of a watery mud. Precipitates of this nature are found particularly in the case of bi- and trivalent metals of the Fourth Period of the Periodic Table such as iron, chromium, copper and zinc when precipitated as hydrated oxides. Because of the low settling rate of this type of precipitate, large commercial operations for the clarifying of waters by precipitation of the referred-to types of solids have required long settling times and/or several process steps in order to develop a thickened precipitate, or sludge, which can be discharged readily. Slimy precipitates, containing large quantities of water, require vast areas for their disposal because of the problem of slow elimination of the water, besides being objectionable from an esthetic standpoint. Large waste disposal areas may be difficult to obtain near a water treatment plant.

The problem of settling precipitated solids from waste water is particularly troublesome in acid mine drainage from either active or abandoned coal mines. In this type of water, iron and aluminum are the prevalent dissolved metals. Because of the great volume of mine drainage at most mine drainage treatment sites, conventional precipitation and settling are generally too slow, and the settled sludge, in many cases containing only about 1% solids, requires too large a disposal area, to be practical.

Considerable improvement in sludge volume can be obtained by use of certain high density sludge processes, which produce a sludge containing from 15% to 45% solids. However, high density sludge processes require continuous recycling of sludge.

It is an object of this invention to produce a low-liquid volume precipitate which can be disposed of in a relatively confined disposal area.

Another object is to produce a dense precipitate of relatively large particle size to minimize handling and disposal.

A further object is to provide a method of precipitating the dissolved solids from waste waters so that a clear, substantially solids-free effluent can be obtained.

Another object is to provide apparatus in which the method of this application can be performed efficiently.

SUMMARY OF THE INVENTION

I have found that the foregoing objects can be obtained by treating a water containing dissolved iron alone or in conjunction with other heavy metals in a moving bed reactor, in which a precipitant is added in sufficient quantity to precipitate all of the dissolved metals.

The feed water to be treated is introduced into the reactor at a predetermined rate, and precipitant, such as hydrated lime for an acid feed water, is introduced into the reactor simultaneously in a quantity sufficient to maintain the pH of the reacting solution high enough to insure precipitation of dissolved material from the feed. A material substantially insoluble in dilute acid, such as clean silica sand, is contained within the reactor in a water medium, and is agitated slowly in the form of a moving bed as feed and precipitant are introduced into the reactor. The precipitated solids, in the form of hydrated oxides, deposit on individual particles of the moving bed to form a tenacious dense precipitate encapsulating the particles. Clear water, substantially free of dissolved heavy metal, is removed as effluent overflowing the reactor. The dense precipitate can be withdrawn from the reactor either continuously or intermittently, as desired, sufficient insoluble bed material and/or dense precipitate being maintained in the reactor to act as nuclei for formation of successive precipitate.

BRIEF DESCRIPTION OF THE DRAWINGS

FIG. 1 is a sectional elevation of one form of reactor for performing the process of the invention.

FIG. 2 is a sectional elevation of another form of reactor.

FIG. 3 is a sectional elevation taken during the line 2—2 of FIG. 2.

DETAILED DESCRIPTION

The following detailed description is a preferred example of performing the method of this invention.

Referring to the drawing, glass reaction vessel 10, used in this example, had a diameter of 2¾ inches and a height of 4⅝ inches. The reaction vessel contained a bed 11 of 40–100 mesh silica sand weighing approximately 500 grams (dry basis). The sand, mixed with water, was agitated by revolving impeller blade 14, the sand-water mixture being maintained at a height of approximately ⅘ the height of the reactor. A synthetic acid amine drainage (AMD) solution was introduced into reaction vessel 10 at pipe 12. The synthetic AMD solution, prepared for this example, had the following analysis:

Table I

| | P.p.m. |
|---|---|
| Iron ($Fe^{++}$) | 160 |
| Calcium (as CaO) | 184 |
| Magnesium (as MgO) | 103 |
| Aluminum (as $Al_2O_3$) | 51 |
| Manganese (Mn) | 5 |
| Sulfate ($SO_4$) | 1030 |
| Acidity (expressed as $CaCO_3$) | 570 |

A total of 102 gallons of the synthetic acid mine drainage solution was used as feed in this example at a flow rate of 1.7 gal./min./cu. ft. of reactor bed, resulting in a detention time of 1.3 minutes.

Precipitant, in the form of hydrated lime, was introduced into reactor 10 at pipe 13. Lime was introduced in the form of a 1% water slurry at a rate equivalent to 0.24 pound of lime (CaO) per 100 gallons of feed water. The pH was maintained between 8 and 9.

Operating the stirrer in the reactor at approximately 40 r.p.m., this sand bed was provided with a uniform agitation without any channelling, and the precipitate of mixed hydrated iron and aluminum upon attaching itself to, and covering, the individual sand particle nuclei, developed precipitate agglomerates of quite uniform size throughout the bed.

In this example, some of the precipitate and sand agglomerates were removed periodically to maintain the original volume of the bed. The gradual increase in size of the individual agglomerates caused no apparent loss of efficiency in the formation of agglomerate. In any long-run operation, the precipitate would eventually build up to such size that iron would no longer be precipitated efficiently. To prevent loss of bed efficiency in promoting the formation of a dense precipitate, precipitate can be withdrawn from the reactor either continuously or intermittently by way of pipe 17, as shown in dotted outline. A discharge launder, not shown, could be located at the level of pipe 17, if necessary.

If the precipitate is withdrawn continuously, eventually substantially all of the sand will be removed from the bed, and gradual replenishment of sand may be made, although the dense precipitate itself will act as nucleus material for subsequent precipitation, if ground or otherwise maintained at proper particle size. Normally, when the bulk of the agglomerate particles is larger than about 30 mesh, the precipitated material should be reground for efficient operation.

If desired, the operation could be discontinued periodically, and all precipitate removed from the reactor. In this case, an entirely new sand bed would be required.

The resultant precipitate is firmly adherent to the sand nucleus, and will not rub off in ordinary handling. The agglomerate has the characteristics of wet sand, draining to about 70% solids, and thus makes excellent fill material which can be readily disposed of.

As aluminum was present in the raw feed water in an amount representing about 1 part aluminum to 6 parts of iron, and substantially all of the aluminum was removed from the water during treatment, the resultant precipitate contained, in addition to iron, the aluminum originally present in the water. A small amount of manganese was also present in the precipitate.

Silica is present in many mine waters in amounts up to about 60 p.p.m. When present in this amount, silica precipitates, along with the iron and other metals, without any significant alteration in the character of the precipitate.

The iron in the precipitate is believed to be in the form of a hydrate of ferrosoferric oxide ($FeO \cdot Fe_2O_3$).

The treated water is withdrawn from the reactor as clear effluent 15 at pipe 16. The treated water had an analysis as shown in Table II below.

Table II

| | |
|---|---|
| Iron (Fe) _____p.p.m__ | 2 |
| Calcium (as CaO) _____p.p.m__ | 426 |
| Magnesium (as MgO) _____p.p.m__ | 103 |
| Aluminum (as $Al_2O_3$) _____p.p.m__ | 2 |
| Manganese (Mn) _____p.p.m__ | 2 |
| Sulfate ($SO_4$) _____p.p.m__ | 980 |
| pH _____ | 8–9 |

It is preferable that the dissolved iron in the feed water be in the ferrous condition when operating under the conditions of the example, although up to 50% ferric iron can be present without any loss in efficiency.

Chloride solutions may be treated as well as sulfates. Generally, when treating acid solutions, the most satisfactory and readily available precipitant would be hydrated lime, although any alkaline earth metal oxide or hydroxide may be used, as well as sodium, potassium or ammonium hydroxide.

Excellent results have been obtained with nucleus particles ranging in size from 40 to 100 mesh. While silica sand, from the standpoint of availability and efficiency, is probably the most desirable seeding, or nucleus material, other sand, such as zircon and olivine may be used. Other compositions, impervious to weak acid solution, will also function as the nucleus material, including the precipitate itself, with or without sand, ferrosoferric oxides or their hydrates from other sources, including magnetite ore, and iron sulfide ore, particularly iron pyrites ($FeS_2$). Ground limestone ($CaCO_3$), although slightly soluble in weak acid, is sufficiently impervious to perform satisfactorily as a nucleus agent in this invention.

The conditions shown in the example for rate of flow of feed and precipitant, detention time, rate of agitation, bed particle size and relative size of bed are considered optimum for the particular type of feed solution and reactor bed used. However, it will be understood that these conditions may be varied within relatively wide ranges without any serious loss of efficiency. Different feed and precipitant solutions and/or different bed material may require adjustment of operating conditions in order to obtain maximum efficiency.

Power requirements for agitation of the bed may be reduced by using a partial fluo-solids system in conjunction with the impeller. A completely fluo-solids system may be used for bed agitation, although it has been found that such a system requires longer detention times to produce a satisfactory precipitate, and removal of iron from the effluent may not be quite as efficient as with the impeller type reactor.

FIG. 2 shows an alternate type of reaction vessel which requires no independently moving stirring mechanism. Reacton vessel 20, in the form of a drum, revolves on idler rolls 21 which operate in supports 31. Raw feed water is introduced into the vessel at pipe 22, which surrounds pipe 23. Precipitant enters the vessel through pipe 23. The annulus formed by pipes 22 and 23 exits in the vessel below the level of the bed of nucleus material 29, the approximate level of the bed being indicated by wavy line 24. Surrounding pipes 22 and 23 at the drum axis is effluent pipe 25, which extends into the clarified water zone 26 and exhausts water as effluent from above the level of the bed. A water seal 27 is fitted around pipes 22, 23 and 25 at the jointure of the pipes with the wall of vessel 20. Ribs 28 are disposed at intervals about the interior cylindrical wall of the vessel to aid in uniform agitation of the bed during the rotation of the reaction vessel. The reaction vessel is rotated by motor-actuated drive roll 32.

The operation of the vessel, which in this instance rotates counter-clockwise, is shown more clearly in FIG. 3. The nozzle of the annulus formed by pipes 22 and 23 is well below the level of the bed, so that the precipitate formed by the reaction of feed and precipitant introduced at the nozzle is thoroughly mixed with nucleus material and is deposited thereon, as in the vessel of FIG. 1. Ribs 28 carry the bed particles partially up the cylindrical wall of vessel 20, whence the particles tumble back into the main body of the bed, resulting in continual thorough mixing of the bed. To avoid the possibility of bed particles falling into effluent pipe 25, the entry to this pipe is located in the clear water from which precipitate has been removed, and well above the bed level.

Plug 30 can be removed from the drum to permit withdrawal of, and replenishment for, spent nucleus material.

The feed inlet tubes of the reactors shown in the several figures should be resistant to dilute mineral acid. The entire interiors of the reactors may be fitted with parts resistant to the dilute acid, although, generally, corrosion in the reactor is not a problem due to the neutralizing action of the lime or other precipitant.

Another example of waste solution which may be treated by the method of this invention includes waste pickle liquor solutions, particularly those to the sulfuric acid-ferrous sulfate type. The invention is also applicable to treatment of combination of waste solutions, as, for example, waste pickle liquor mixed with chromic acid wastes from electroplating operations, wherein chromic acid is reduced by the ferrous iron of the waste pickle liquor to produce a chromic salt precipitable in the reactor.

I claim:

1. A method for removing a metal of the group consisting of iron and mixtures of iron with other metals from solution in the form of a dense precipitate which comprises introducing as feed an aqueous acidic solution containing said metal in the form of a soluble salt of the group consisting of sulfate and chloride into a reaction zone of a moving bed of nucleus material substantially impervious to weak acid solutions of the group consisting of sand, ferrosoferric oxide, ferrosoferric hydrated oxide, ferrosoferric oxide ore iron pyrites, limestone, and mixtures thereof, introducing a precipitant of the group consisting of an alkaline earth metal hydroxide or oxide and an alkali metal oxide or hydroxide into the reaction zone in an amount at least sufficient to precipitate substantially all of said metal in the form of a dense precipitate on particles of said nucleus material, and withdrawing from the reaction zone, as effluent, water from which said metal has been removed.

2. A method according to claim 1 in which the metal is iron mixed with a member of the group consisting of chromium, zinc, manganese and aluminum.

3. A method according to claim 1 in which the metal is predominantly iron.

4. A method according to claim 2 in which the metal is a mixture of iron and aluminum.

5. A method according to claim 1 in which the iron in the feed is in the form of a sulfate.

6. A method according to claim 2 in which the iron in the feed is in the form of a sulfate.

7. A method according to claim 1 in which the nucleus material is sand.

8. A method according to claim 2 in which the nucleus material is sand.

9. A method according to claim 1 in which the precipitant is lime.

10. A method according to claim 8 in which the precipitant is lime.

11. A method according to claim 3 in which at least 50% of the dissolved iron in the feed is in the ferrous condition.

12. A method according to claim 8 in which at least 50% of the dissolved iron in the feed is in the ferrous condition.

13. A method according to claim 1 in which the pH in the reaction zone ranges between 8 and 10.

14. A method according to claim 12 in which the sand particles have a particle size of from 40 to 100 mesh.

15. A method according to claim 12 in which the resultant water from which iron has been removed contains less than 3 p.p.m. iron.

16. A method according to claim 1 in which the moving bed is activated by mechanical means.

17. A method according to claim 12 in which the moving bed is activated by mechanical means.

18. A method according to claim 2 in which the feed is acid mine drainage solution.

19. A method according to claim 12 in which the aqueous feed solution is a weak acid solution of sulfuric acid and ferrous sulfate.

20. Apparatus for treating an aqueous acid solution containing a metal of the group consisting of iron and mixtures of iron with other metals in the form of a soluble salt of the group consisting of sulfate and chloride to remove said metal in the form of a dense precipitate on a nucleus material of the group consisting of sand, ferrosoferric oxide, ferrosoferric hydrated oxide, ferrosoferric oxide ore, iron pyrites, limestone, and mixtures thereof present as a moving bed in the reaction zone of said apparatus which comprises:

(a) a reaction vessel embodying a reaction zone,
(b) means for introducing said solution into the reaction zone of said vessel,
(c) means for introducing a precipitant of the group consisting of alkaline earth metal hydroxides and oxides into the reaction zone of said vessel,
(d) mechanical means within said zone for agitating a mixture of solution, nucleus material and precipitant to cause precipitation of said metal as hydrated oxide on particles of said nucleus material,
(e) a second zone immediately above said reaction zone which acts as a reservoir for water from which metal impurities have been removed, and
(f) means for withdrawing said water from said vessel.

21. An apparatus according to claim 20 wherein agitating means (d) is a mechanically driven rotatable agitator located within said reaction zone.

22. An apparatus according to claim 20 wherein reaction vessel (a) is a closed cylindrical vessel capable of rotation on its axis with said axis disposed substantially horizontal.

23. An apparatus according to claim 22 wherein reaction vessel (a) is a closed cylindrical vessel capable of rotation on its axis with said axis disposed substantially horizontal, exits for means (b) and (c) are located below the level of the moving bed within said reaction zone and are maintained in such position during rotation of the reaction vessel, and entrance for means (f) is located in said second zone below the level of the water and above the moving bed in said zone.

24. An apparatus according to claim 23 wherein a plurality of ribs is disposed about the inside cylindrical wall of the reaction vessel.

References Cited

UNITED STATES PATENTS

| | | | |
|---|---|---|---|
| 350,679 | 10/1886 | Hyatt | 210—150X |
| 785,312 | 3/1905 | Langley | 210—50 |
| 1,254,009 | 1/1918 | Hughes et al. | 23—286X |
| 2,259,717 | 10/1941 | Zentner | 210—46X |
| 2,946,666 | 7/1960 | Eymann | 23—286X |
| 3,034,883 | 5/1962 | Hignett | 23—286X |
| 3,218,252 | 11/1965 | Glover et al. | 210—7X |
| 3,294,680 | 12/1966 | Lancy | 210—59X |

FOREIGN PATENTS

| | | | |
|---|---|---|---|
| 25,394 | 1904 | Great Britain | 23—286 |

OTHER REFERENCES

Gurnham, C. F., Principles of Industrial Waste Treatment, 1955, John Wiley & Sons, New York, pp. 177–186.

MICHAEL ROGERS, Primary Examiner

U.S. Cl. X.R.

210—210, 219

UNITED STATES PATENT OFFICE
CERTIFICATE OF CORRECTION

Patent No. 3,579,443             Dated May 18, 1971

Inventor(s) Russel J. Horst

It is certified that error appears in the above-identified patent and that said Letters Patent are hereby corrected as shown below:

In the heading to the printed specification, after line 4, insert -- assignor to Bethlehem Steel Corporation, a corporation of Delaware --.

Signed and sealed this 7th day of December 1971.

(SEAL)
Attest:

EDWARD M. FLETCHER, JR.                ROBERT GOTTSCHALK
Attesting Officer                       Acting Commissioner of Patents